(12) United States Patent
Burry et al.

(10) Patent No.: US 9,292,759 B2
(45) Date of Patent: Mar. 22, 2016

(54) METHODS AND SYSTEMS FOR OPTIMIZED PARAMETER SELECTION IN AUTOMATED LICENSE PLATE RECOGNITION

(75) Inventors: Aaron Michael Burry, Ontario, NY (US); Yonghui Zhao, Penfield, NY (US); Vladimir Kozitsky, Rochester, NY (US)

(73) Assignee: Xerox Corporation, Norwalk (*) Notice: Subject to any disclaimer, the term of this patent is extended or adjusted under 35 U.S.C. 154(b) by 297 days.

(21) Appl. No.: 13/466,068

(22) Filed: May 7, 2012

(65) Prior Publication Data
US 2013/0294653 A1 Nov. 7, 2013

(51) Int. Cl.
*G06K 9/32* (2006.01)

(52) U.S. Cl.
CPC .......... *G06K 9/3258* (2013.01); *G06K 2209/15* (2013.01)

(58) Field of Classification Search
None
See application file for complete search history.

(56) References Cited

U.S. PATENT DOCUMENTS

| 8,644,561 | B2 | 2/2014 | Burry et al. | |
|---|---|---|---|---|
| 2010/0246961 | A1* | 9/2010 | Prasad et al. | 382/181 |
| 2013/0294652 | A1 | 11/2013 | Fan et al. | |

OTHER PUBLICATIONS

Llorens, David, et al. "Car license plates extraction and recognition based on connected components analysis and HMM decoding." Pattern Recognition and Image Analysis. Springer Berlin Heidelberg, 2005. 571-578.*
Sokratis, Vavilis, and Ergina Kavallieratou. "A tool for tuning binarization techniques." ICDAR. vol. 11. 2011.*
Tone Reproduction, Wikipedia:the free encyclopedia, Nov. 5, 2009.*
Jiao, Jianbin, Qixiang Ye, and Qingming Huang. "A configurable method for multi-style license plate recognition." Pattern Recognition 42.3 (2009): 358-369.*
Liu, Ying, and Sargur N. Srihari. "Document image binarization based on texture features." Pattern Analysis and Machine Intelligence, IEEE Transactions on 19.5 (1997): 540-544.*
Tree-traversal, Wikipedia: the free encyclopedia, Apr. 26, 2011, http://en.wikipedia.org/w/index.php?title=Tree_traversal&oldid=425965428.*
Miller, Rob, "Recursion", "An Introduction to the Imperative Part of C++", Imperial College London, Jun. 7, 2011.*
Sezgin, M. and Sankur, B., "Survey over image thresholding techniques and quantitive performance evaluation", J. Elect. Imaging, 13(1), (2004) 146-165.
Gonzalez, R. and Woods, R., "Use of Boundary Characteristics for Histogram Improvement and Local Thresholding," Digital Image Processing, 3rd Edition. Prentice Hall. (2007) pp. 608-610.
Pikaz, A. and Averbuch, A., "Digital Image Thresholding Based on Topological Stable State", Pattern Recog., 29, (1996) 829-843.
Otsu, N., "A Threshold Selection Method from Gray-Level Histograms," IEEE Trans. Syst. Man Cybern., SMC-9, (1979) 62-66.

* cited by examiner

*Primary Examiner* — Stephen R Koziol
*Assistant Examiner* — Raphael Schwartz
(74) *Attorney, Agent, or Firm* — MH2 Technology Law Group LLP (57) ABSTRACT

A system and method for automatically recognizing license plate information, the method comprising receiving an image of a license plate, and generating a plurality of image processing data sets, wherein each image processing data set of the plurality of image processing data sets is associated with a score of a plurality of scores by a scoring process comprising determining one or more image processing parameters, generating the image processing data set by processing the image using the one or more image processing parameters, generating the score based on the image processing data, and associating the image processing data set with the score.

18 Claims, 5 Drawing Sheets

METHODS AND SYSTEMS FOR OPTIMIZED PARAMETER SELECTION IN AUTOMATED LICENSE PLATE RECOGNITION

TECHNICAL FIELD

The present disclosure relates generally to methods, systems, and computer-readable media for automated license plate character recognition.

BACKGROUND

Automated license plate recognition (hereinafter, "ALPR") generally refers to an automated process for applying optical character recognition (hereinafter, "OCR") techniques to images captured by traffic cameras to recognize vehicle license plate information.

ALPR technology is useful for law enforcement and other purposes, allowing for mass surveillance of vehicle traffic for a variety purposes at very low personnel costs. ALPR technology can be utilized concurrently with a variety of law enforcement procedures, such as techniques for determining vehicle speed, monitoring traffic signals, electronic toll collection, and individual vehicle surveillance.

ALPR methods can involve three steps. The first step can be determining the location of the license plate in the image (hereinafter, "plate localization"). The second step can be separating the individual characters on the license plate from the remainder of the image (hereinafter, "character segmentation"). The third step can be applying OCR techniques to the segmented characters.

Various image processing methods can be utilized as part of the ALPR process, including, for example, binarization. Generally, binarization is a process by which a color or grayscale image can be analyzed, and a binary value can be assigned to each pixel of the image based on a set of parameters and the original color of the pixel. Such binary values can be visually depicted as black or white to create a monochromatic image. Therefore, a given pixel color can be assigned a "white" value or a "black" value during binarization.

Binarization of an image facilitates many processes that can be performed on the image. For example, a computing device can analyze binarization data and recognize clusters of adjacent pixels with the same binary value and match the clusters with known patterns of characters or objects.

However, the captured images of vehicle license plates are not always optimal for character recognition. For example, objects such as trailer hitches, rust, dirt, stickers, or/and license plate frames can occlude license plate characters from a camera's perspective. Additional factors, such as shadow and state license plate logos, can further slow or prevent the character recognition by hindering various ALPR sub-processes, such as binarization.

Such factors can be alleviated if an optimum set of parameters are utilized with the various ALPR sub-processes. For example, utilizing an optimum threshold value during the binarization process can resolve irregularities caused by factors such as shadowing and non-character objects. However, determining the optimum parameters is complicated by the fact that the optimum parameters can vary based on numerous factors, including time of day, license plate design, occlusion factors, position of the camera, and quality of the image.

Accordingly, APLR technology may be improved by techniques for dynamically determining optimum parameters for APLR sub-processes, such as binarization.

SUMMARY OF THE DISCLOSURE

The present disclosure relates generally to methods, systems, and computer readable media for providing these and other improvements to APLR technology.

Once an image of a license plate has been captured using a camera, a computing device can perform various APLR sub-processes on the image with a first set of parameters to determine license plate information. APLR sub-processes can include, but are not limited to, binarization, plate localization, character segmentation, OCR, image normalization, image smoothing, noise reduction, tone reduction curves, edge filtering, Laplacian filtering, Gaussian smoothing, and pattern detection. Each APLR sub-process can individually require one or more parameters, which can be used as various inputs, including, but not limited to, threshold values, filter selection, and variable substitution.

The APLR sub-processes can result in a set of segmented license plate characters. Each segmented license plate character can be scored based on a number of factors, including, but not limited to, a connected component analysis, a character shape analysis, a character orientation analysis, pattern recognition, straight-line normalization, a character placement analysis, and expected license plate patterns. Once the characters are scored, the APLR sub-processes can be repeated with a new set of parameters, and the resulting segmented characters can similarly be scored. The process can be repeated a set number of times or until a threshold score is obtained.

Generally, the best score obtained is associated with the segmented license plate characters that are optimized for character recognition. Therefore, such dynamic selection of parameters can result in improved accuracy and efficiency in character recognition.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

The following detailed description refers to the accompanying drawings. Wherever possible, the same reference numbers are used in the drawings and the following description to refer to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

Figure 1:
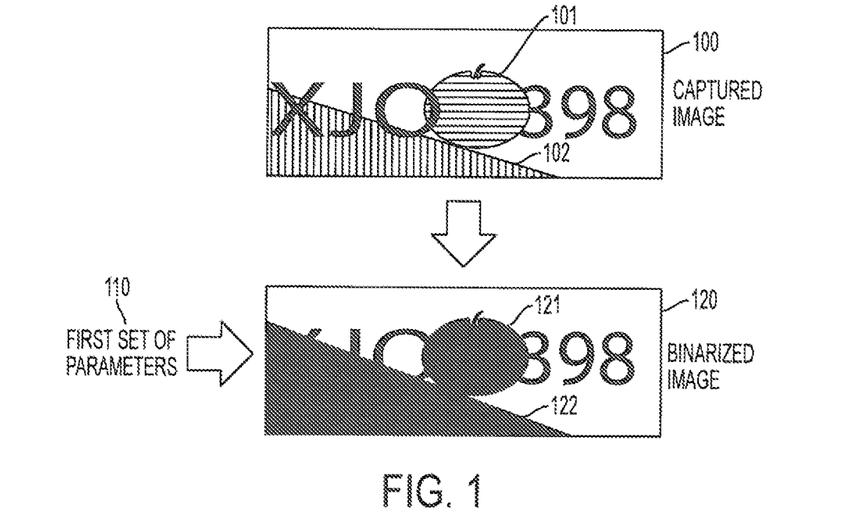
FIG. 1 is a diagram depicting exemplary images of a license plate before and after binarization, consistent with certain disclosed embodiments.

FIG. 1 is a diagram depicting exemplary images of a license plate before and after binarization, consistent with certain disclosed embodiments. As depicted in FIG. 1, captured license plate image 100 can be a captured image of a license plate with characters XJO 398 captured by an image recording device, such as a traffic camera. Characters XJO 398 can be a solid color, such as blue or black. The background of the license plate can also be a solid color, such as white or yellow. The license plate can also include a state logo, such as graphic element 101. As depicted in FIG. 1, graphic element 101 can overlap characters O and 3. Graphic element 101 can be a different color than the license plate characters and the background, such as orange. Further, captured image 100 can include shadow 102 cast over part of the license plate. As depicted in FIG. 1, shadow 102 can overlap characters XJO and part of the license plate background. The area covered by shadow 102 can appear darker compared to the remainder of the image.

A computing device can perform a binarization technique on captured image 100 using a first set of parameters 110 to produce binarized image 120. Binarized image 120 is an exemplary visual representation of the binarization process, and, in some embodiments, an actual binarized image may not be necessary to perform the disclosed processes. In some embodiments, each pixel from captured image 100 can be assigned a value of 0 or 1 based on the binarization algorithm and the first set of parameters. In the visual representation of binarized image 120, pixels assigned a value of 0 can be represented as black and pixels assigned a value of 1 can be represented as white. As depicted in binarized image 120, characters XJO 398, graphic element 121, and the area covered by shadow 122 have been assigned a value of 0 or black, and the remainder of the background of the image has been assigned a value of 1 or white.

A computing device can segment the binarized image into characters using a variety of methods, including, but not limited to, segmenting clusters of pixels with the same assigned value. Because the pixels used to depict characters XJO 3, graphic element 121, and shadow 122 overlap and have all been assigned the same value of 0 or black, a computing device may be unable to separate those objects. However, a computing device can segment the 9 and the 8 from the remainder of the image due to the surrounding background pixels assigned a value of 1 or white. Accordingly, a computing device may segment the image into three characters. The first character can include XJO 3, graphic element 121, and shadow 122, the second character can be character 9, and the third character can be character 8.

A computing device can assign scores to each character segment using methods that, include, but are not limited to, a connected component analysis, a character shape analysis, a character orientation analysis, pattern recognition, straight-line normalization, and a character placement analysis. For example, a range of scores can be from one to ten, and a computing device can perform pattern recognition on the 9 and the 8 and output a high score, such as a score of nine out of ten, because the characters have recognized patterns. However, pattern recognition performed on the combined XJO 3, graphic element 121, and shadow 122, as shown, can produce a low score, such as a score of one out of ten, as the combined character does not match any recognized patterns. A total score can be given to binarized image 120 based on the individual scores of each character, which can be stored and associated with the first set of parameters and/or the binarized image data. The computing device can then repeat the binarization process with new parameters, as depicted in FIG. 2.

Figure 2:
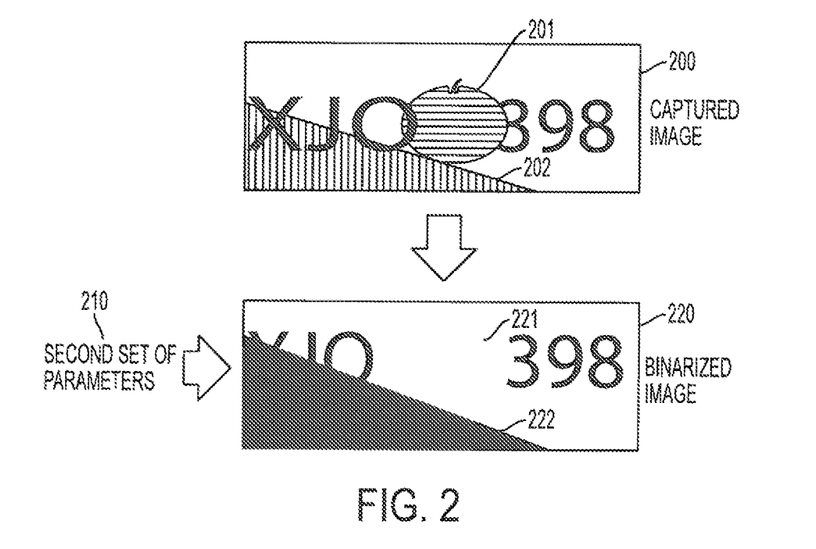
FIG. 2 is a diagram depicting exemplary images of a license plate before and after binarization, consistent with certain disclosed embodiments.

FIG. 2 is a diagram depicting exemplary images of a license plate before and after binarization, consistent with certain disclosed embodiments. As depicted in FIG. 2, captured license plate image 200 can represent the same captured license plate image as depicted in FIG. 1 and can include characters XJO 398, graphic element 201, and shadow 202, as described above for captured image 100.

A computing device can perform a binarization technique on captured image 200 using a second set of parameters 210 to produce binarized image 220. Every pixel from captured image 200 can be assigned a value of 0 or 1 based on the binarization algorithm and the second set of parameters. In the visual representation of binarized image 220, pixels assigned a value of 0 can be represented as black and pixels assigned a value of 1 can be represented as white. As depicted in binarized image 220, characters XJO 398 and the area covered by shadow 122 have been assigned a value of 0 or black, similar to binarized image 120. However, dissimilar to binarized image 120, in binarized image 220, graphic element 221 has been assigned a value of 1 or white, similar to the background of the image. Accordingly, graphic element 221 is not visible in binarized image 220 because graphic element 221 is the same color as the background.

A computing device can segment the binarized imaged into characters using a variety of methods, including the methods described above. Because the pixels used to depict characters XJO and shadow 222 have all been assigned the same value of 0 or black, a computing device may be unable to separate those objects. However, a computing device can segment the 3, the 9, and the 8 from the remainder of the image due to the surrounding background pixels assigned to a value of 1 or white. Accordingly, a computing device may segment the image into four characters. The first character can include XJO and shadow 222, the second character can be character 3, the third character can be character 9, and the fourth character can be character 8.

A computing device can assign scores to each character segment using the methods disclosed above. For example, a computing device can perform pattern recognition on the 3, the 9, and the 8 and output a high score because the characters have recognized patterns. However, pattern recognition performed on the combined XJO and shadow 222, as shown, can produce a low score, as the combined character does not match any recognized patterns. A total score can be assigned to binarized image 220 based on the individual scores of each character, which can be stored and associated with the second set of parameters and/or the binarized image data. Notably, binarized image 220 can be assigned a score that is better than the score assigned to binarized image 120 because more characters patterns were recognized and given higher scores. The computing device can then repeat the binarization process with new parameters, as depicted in FIG. 3.

Figure 3:
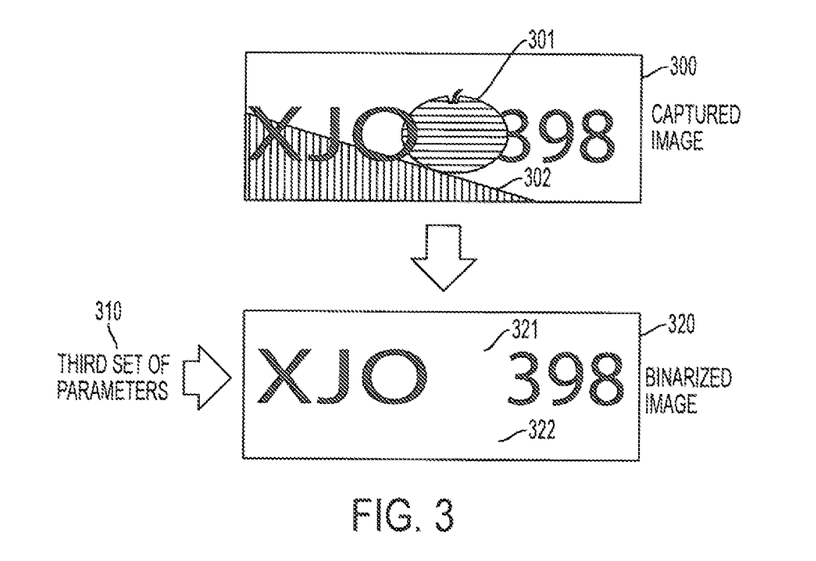
FIG. 3 is a diagram depicting exemplary images of a license plate before and after binarization, consistent with certain disclosed embodiments.

FIG. 3 is a diagram depicting exemplary images of a license plate before and after binarization, consistent with certain disclosed embodiments. As depicted in FIG. 3, captured license plate image 300 can represent the same captured license plate image as depicted in FIGS. 1 and 2, and can include characters XJO 398, graphic element 301, and shadow 302, as described above for captured image 100.

A computing device can perform a binarization technique on captured image 300 using a third set of parameters 310 to produce binarized image 320. Every pixel from captured image 300 can be assigned a value of 0 or 1 based on the binarization algorithm and the third set of parameters. In the visual representation of binarized image 320, pixels assigned a value of 0 can be represented as black and pixels assigned a value of 1 can be represented as white. As depicted in binarized image 320, only characters XJO 398 have been assigned a value of 0 or black. Additionally, graphic element 221 and the background area covered by shadow 322 have been assigned a value of 1 or white, similar to the remainder of the background of the image. Accordingly, graphic element 221 and shadow 322 are not visible in binarized image 320 because they are the same color as the background.

A computing device can segment the binarized imaged into characters using a variety of methods, including the methods described above. Accordingly, a computing device can segment the X, the J, the O, the 3, the 9, and the 8 from the remainder of the image due to the surrounding background pixels assigned to a value of 1 or white. Therefore, a computing device may segment the image into six characters: X, J, O, 3, 9, and 8.

A computing device can assign scores to each character segment using the methods disclosed above. For example, a computing device can perform pattern recognition on all six characters and output a high score for each character because all six characters, as shown, have recognized patterns. A total score can be assigned to binarized image 320 based on the individual scores of each character, which can be stored and associated with the third set of parameters and/or the binarized image data. Notably, binarized image 220 can be assigned a score that is better than the scores assigned to both binarized image 120 and binarized image 220 because more characters patterns were recognized and given higher scores. The computing device can then repeat the binarization process with new parameters, determine that a threshold score has been obtained, or determine that a set number of iterations have been performed and terminate the binarization process.

Once the binarization process has been terminated, the computing device can select the segmented characters with the best total score. The computing device can further perform OCR on the segmented characters and store the license plate information.

Figure 4:
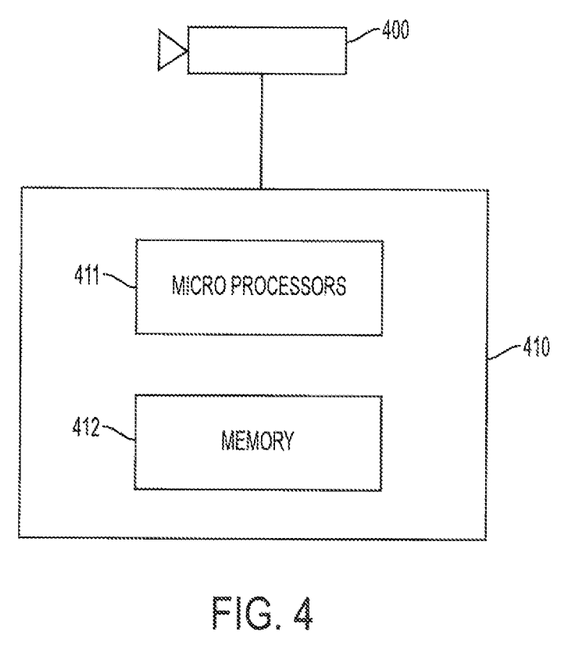
FIG. 4 is a diagram depicting an exemplary traffic camera attached to a computing device that may utilize APLR technology, consistent with certain disclosed embodiments.

FIG. 4 is a diagram depicting an exemplary traffic camera attached to a computing device that may utilize APLR technology, consistent with certain disclosed embodiments. Traffic camera 400 may represent any type of camera that is capable of capturing still images or video. Computing device 410 may represent any type of computing device able to receive input from traffic camera 400. Computing device 410 can be connected to traffic camera 400, as shown. Additionally, computing device 410 can be integrated with traffic camera 400 as one device, or can be remotely connected, via a network connection, to traffic camera 400. Further, computing device 410 is not limited to being connected to a single traffic camera and, in some embodiments, can be connected to a fleet of traffic cameras.

Computing device 410 may include, for example, one or more microprocessors 411 of varying core configurations and clock frequencies; one or more memory devices or computer-readable media 412 of varying physical dimensions and storage capacities, such as flash drives, hard drives, random access memory, etc., for storing data, such as images, files, and program instructions for execution by one or more microprocessors 411; one or more transmitters for communicating over network protocols, such as Ethernet, code divisional multiple access (CDMA), time division multiple access (TDMA), etc. Components 411 and 412 may be part of a single device, as disclosed in FIG. 4, or may be contained within multiple devices. Those skilled in the art will appreciate that the above-described componentry is exemplary only, as computing device 410 may comprise any type of hardware componentry, including any necessary accompanying firmware or software, for performing the disclosed embodiments.

Figure 5:
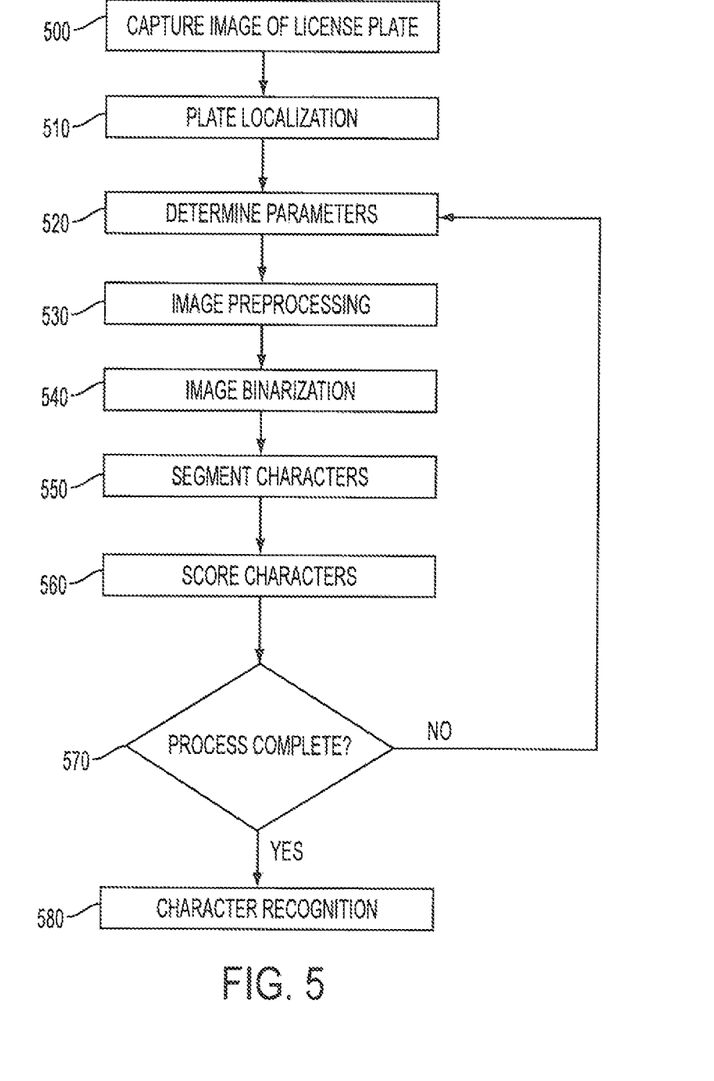
FIG. 5 is a flow diagram illustrating an exemplary method of implementing APLR technology on a computing device, consistent with certain disclosed embodiments.

FIG. 5 is a flow diagram illustrating an exemplary method of implementing APLR technology on a computing device, consistent with certain disclosed embodiments. In, 500, the process can begin when a traffic camera captures an image that includes a depiction of a license plate of a vehicle. An image may refer to a single image, multiple images, or a video captured by a traffic camera. The image can additionally include part of the vehicle and/or additional background objects. A computing device integrated with or connected to the traffic camera can then receive and store the image.

In 510, the computing device can perform plate localization to determine the license plate location within the image using various methods known in the art, including, but not limited to, edge detection and binarization. In some embodiments, the computing device can crop the image around the detected license plate. In other embodiments, the computing device can calculate and store the license plate location in association with the image or as metadata included with the image. The license plate location can be stored as, for example, pixel locations of the edges of the license plate. Hereinafter, reference will be made to an image, which can include either the cropped and/or the uncropped form of the image.

In 520, the computing device can determine a set of parameters for one or more ALPR sub-processes. Such parameters can include, but are not limited to, binarization threshold values, tone reproduction curve parameters, filter selection parameters, filtering parameters, and variable values.

In the first iteration of 520 for a given image, an initial set of parameters can be determined. In some embodiments, the computing device can determine the initial set of parameters by utilizing a predetermined set of initial parameters. In such embodiments, the predetermined set of initial parameters can be preprogrammed into the ALPR software. Alternatively, the predetermined set of initial parameters can be manually entered by an operator or can be variable depending on certain factors, such as time of day, traffic levels, image quality, etc. The predetermined set of initial parameters can be unique to the specific computing device and/or camera, or can be universal to a fleet of cameras and/or computing devices.

In further iterations of 520 for a given image, new sets of parameters can be determined. In some embodiments, the new set of parameters for a particular iteration can be predetermined based on the number of the iteration. For example, the computing device can use a predetermined second set of parameters for the second iteration and a predetermined third set of parameters of the third iteration, etc.

In other embodiments, the new set of parameters can be determined dynamically based on various factors, including, but not limited to, previously used parameter sets that have yielded high character scores for segmented characters, parameter sets adjusted for the time of day, and parameter sets selected based on determined information about the license plate, such as jurisdiction information.

In further embodiments, a combination of the static and dynamic parameter sets may be used on the same license plate.

The various parameter sets may or may not contain parameters that are completely unique between sets. Accordingly, a first parameter set can contain no parameters in common with a second parameter set. Alternatively, a first parameter set can contain one or more parameters in common with a second parameter set as long as the second parameter set contains at least one unique parameter compared to the first parameter set.

As discussed below, 530 through 560 utilizes a single set of parameters per iteration, and the single set of parameters can represent the initial set of parameters or one of the subsequent sets of parameters, depending on the iteration.

In 530, the computing device can perform one or more image preprocessing steps on the image. Image preprocessing steps can include, but are not limited to, image normalization and image smoothing. In some embodiments, image normalization is a process by which contrast is increased in the image through the use of, for example, a tone reproduction curve. The set of determined parameters from 520 can include parameters for a tone reproduction curve, such as tone mean and tone variation. The computing device can utilize the tone reproduction curve with the tone reproduction curve parameters to obtain a normalized image.

Additionally, image smoothing can be applied to the image. Image smoothing is a process by which noise can be removed from an image and important patterns can be captured. In some embodiments, image smoothing can be implemented by applying a Gaussian smoothing filter to the image. The set of determined parameters from 520 can include parameters for the Gaussian smoothing filter, such as filter size and standard deviation. The computing device can apply the Gaussian smoothing filter with the Gaussian smoothing filter parameters to obtain an image more suitable for additional filters or binarization.

Additional preprocessing steps can include, but are not limited to, applying an edge filter and/or a Laplacian filter to the image.

In 540, the computing device can perform binarization on the image, for example, as described above for FIGS. 1-3. The set of determined parameters from 520 can include parameters for the binarization process, such as the binarization threshold. The computing device can perform binarization on the image using the binarization threshold from the determined parameters. The binarization process can result in a binarized image and/or binarized image data.

In some embodiments, binarization can be performed individually on subsets of the image, including subsets of the license plate. Further, the parameters used during the binarization process can vary from subset to subset. The subsets can be predetermined or can be selected by the computing device before the binarization process beings. For example, the computing device can determine that a subset of the image is a darker shade than the remainder of the image and select a particular binarization threshold value from the determined set of parameters accordingly. Or, the determined set of parameters can include binarization threshold values for pre-determined subsets of the image.

In 550, the computing device can segment the characters on the license plate in the binarized image. In some embodiments, the computing device can analyze the binarized image and determine the license plate characters by clusters of similarly number pixels, as described above. The computing device can segment the characters based on such clusters. The set of determined parameters from 520 can include parameters for determining segmentation thresholds, such as minimum pixel size of characters.

In 560, the computing device can score the segmented characters. In some embodiments characters can be scored using a connected component analysis to analyze properties of the segmented characters. For example, segmented character properties that can be analyzed include, but are not limited to, orientation of the major axis of the character, area of the character, dimensions of the character, percentage of the character filled, center of the character, distance of the character from an edge, and distance of the character from the center of the license plate. The segmented characters can then be assigned a score based on such factors as similarities to known characters and goodness-of-fitting to a straight line.

In some embodiments, the segmented character score can be partially or fully based on known properties of characters used on license plates in a particular jurisdiction, such as character fonts and character sizes. In additional embodiments, the segmented character score can be partially or fully based on determined properties of previously processed license plates by the same computing device or by one or more computing devices connected to the computing devices via a network connection. In further embodiments, the segmented character score can additionally be based on the expected number of characters on a license plate.

After a score is given to the segmented characters, a total score for the iteration can be calculated. The total score can be calculated using a variety of methods, such as summing the scores of individual characters and/or taking a weighted or un-weighted average of the scores of individual characters. Further, the total score can be adjusted based on the number of segmented characters determined compared to the expected number of characters on a license plate.

In 570, the computing device can determine whether to process the image again by repeating 520 through 560 or proceed to 580 for character recognition of the segmented characters. In some embodiments, the computing device can determine whether a threshold total score for the segmented characters has been reached for the current set of segmented characters. If the threshold total has been reached, the computing device can proceed to perform character recognition on the segmented characters from 550. If the threshold total has not been reached, the computing device can determine a new set of parameters and repeat the image processing. The threshold total can be entered by an operator, hardcoded into the software, or vary depending on various factors, including time of day, traffic levels, image quality, and number of previous iterations on the same image.

In other embodiments, the computing device can determine whether a set number of iterations of the image processing have completed. For example, a computing device can process an image ten times with ten unique sets of parameters before proceeding to 580. If the computing device determines that the set number of iterations have not been performed, the computing device can store the segmented characters with the associated scores and repeat the image processing with a new set of parameters. If the threshold total has been reached, in some embodiments, the computing device can select the segmented characters with the best total score and proceed to 580 using the best scoring segmented characters.

In other embodiments, the computing device can select segmented characters from more than one image processing iteration. For example, a first iteration can result in a first character with a high score and other characters with low scores. Subsequently, a second iteration can result in a first character with a low score and several characters with high scores. After determining that the first character from the first iteration and the first character from the second iteration likely represent the same license plate character, the computing device can select the first character from the first iteration and the remaining characters from the second iteration and proceed to 580 using the selected characters.

In 580, the computing device can perform known methods of character recognition, such as OCR, on the segmented characters with the highest individual scores or highest total score. The image, the segmented characters, the scores, and the recognized character information can then be stored in memory.

While the steps depicted in FIG. 5 have been described as performed in a particular order, the order described is merely exemplary, and various different sequences of steps can be performed, consistent with certain disclosed embodiments. Further, the steps described are not intended to be an exhaustive or absolute, and various steps can be inserted or removed. For example, in some embodiments, the computing device can perform image preprocessing steps on the image before and/or after plate localization. Additionally, in other embodiments, image preprocessing may not be performed.

Further, the computing device can perform various sequences of the above-described steps during different iterations of the same image. For example, the computing device may not perform image preprocessing on the initial iteration, but may perform image preprocessing on a subsequent iteration of the same image.

In some embodiments, image binarization can be performed before plate localization. In other embodiments, plate localization may not be performed and characters are segmented from the full image. In further embodiments, character segmentation may not be performed and a score can be calculated for the license plate as a whole.

The foregoing description of the present disclosure, along with its associated embodiments, has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments. The steps described need not be performed in the same sequence discussed or with the same degree of separation. Likewise, various steps may be omitted, repeated, or combined, as necessary, to achieve the same or similar objectives or enhancements. Accordingly, the present disclosure is not limited to the above-described embodiments, but instead is defined by the appended claims in light of their full scope of equivalents.

What is claimed is:

1. A method for automatically recognizing license plate information, the method comprising:
   receiving an image of a license plate;
   generating, using one or more processors, a first image processing data set by processing the image using a first set of image processing parameters;
   generating a first computer-generated score based on the first image processing data set by:
      segmenting the image into a first plurality of characters based on the first image processing data set;
      generating a segment score for each character of the first plurality of characters; and
      totaling the segment scores for each character of the first plurality of characters to determine the first computer-generated score;
   determining that the first computer-generated score is:
      greater than a first threshold score; and
      less than a second threshold score;
   in response to determining that the first computer-generated score is greater than the first threshold score and is less than the second threshold score, determining a second set of image processing parameters based on the first set of image processing parameters;
   generating a second image processing data set by processing the image using the second set of image processing parameters;
   generating a second computer-generated score based on the second image processing data set by:
      segmenting the image into a second plurality of characters based on the second image processing data set;
      generating a segment score for each character of the second plurality of characters; and
      totaling the segment scores for each character of the second plurality of characters to determine the second computer-generated score;
   determining that the second computer-generated score is greater than the second threshold score;
   determining that a segment score of a character of the first plurality of characters is greater than a segment score of a corresponding character of the second plurality of characters; and
   in response to determining the second computer-generated score is greater than the second threshold score and that the segment score of the character of the first plurality of characters is greater than the segment score of the corresponding character of the second plurality of characters, generating license plate data based on the character of the first plurality of characters and the second image processing data set, wherein the character of the first plurality of characters replaces the corresponding character of the second plurality of characters in the license plate data.

2. The method of claim 1, wherein generating the first image processing data set and the second image processing data set comprises performing binarization on the image.

3. The method of claim 1, wherein generating the first image processing data set and the second image processing data set comprises applying a tone reproduction curve to the image.

4. The method of claim 1, wherein generating the first image processing data set and the second image processing data set comprises applying a filter to the image.

5. The method of claim 1, wherein generating the segment score for each character of the first plurality of characters and the second plurality of characters comprises generating the segment score using a connected component analysis.

6. The method of claim 1, wherein generating the first computer-generated score and the second computer-generated score comprises generating the score based on expected license plate information.

7. The method of claim 1, wherein generating the first computer-generated score and the second computer-generated score comprises generating the score based on an expected position of license plate information.

8. A system configured for automatically recognizing license plate information, the system comprising:
   a processing system comprising one or more processors; and
   a memory system comprising one or more computer-readable media, wherein the one or more computer-readable media contain instructions that, when executed by the processing system, cause the processing system to perform operations comprising:
      receiving an image of a license plate;
      generating a first image processing data set by processing the image using a first set of image processing parameters;
      generating a first computer-generated score based on the first image processing data set by:
         segmenting the image into a first plurality of characters based on the first image processing data set;
         generating a segment score for each character of the first plurality of characters; and totaling the segment scores for each character of the first plurality of characters to determine the first computer-generated score;

determining that the first computer-generated score is:
greater than a first threshold score; and
less than a second threshold score;

in response to determining that the first computer-generated score is greater than the first threshold score and is less than the second threshold score, determining a second set of image processing parameters based on the first set of image processing parameters;

generating a second image processing data set by processing the image using the second set of image processing parameters;

generating a second computer-generated score based on the second image processing data set by:
segmenting the image into a second plurality of characters based on the second image processing data set;
generating a segment score for each character of the second plurality of characters; and
totaling the segment scores for each character of the second plurality of characters to determine the second computer-generated score;

determining that the second computer-generated score is greater than the second threshold score;

determining that a segment score of a character of the first plurality of characters is greater than a segment score of a corresponding character of the second plurality of characters; and in response to determining the second computer-generated score is greater than the second threshold score and that the segment score of the character of the first plurality of characters is greater than the segment score of the corresponding character of the second plurality of characters, generating license plate data based on the character of the first plurality of characters and the second image processing data set, wherein the character of the first plurality of characters replaces the corresponding character of the second plurality of characters in the license plate data.

9. The system of claim 8, wherein generating the first image processing data set and the second image processing data set comprises performing binarization on the image.

10. The system of claim 8, wherein generating the segment score for each character of the first plurality of characters and the second plurality of characters comprises generating the segment score using a connected component analysis.

11. The system of claim 8, wherein generating the first computer-generated score and the second computer-generated score comprises generating the score based on expected license plate information.

12. The system of claim 8, wherein generating the first computer-generated score and the second computer-generated score comprises generating the score based on an expected position of license plate information.

13. The method of claim 1, further comprising generating the first set of image processing parameters based on at least one of a current time, a current traffic level, or a determined quality of the image.

14. The method of claim 1, wherein the first computer-generated score and the second computer-generated score are generated based on at least one of known properties of characters used on license plates in a determined jurisdiction, previously determined properties of previously processed license plates from the same location, or an expected number of characters on the license plate.

15. The system of claim 8, the operations further comprising generating the first set of image processing parameters based on at least one of a current time, a current traffic level, or a determined quality of the image.

16. The system of claim 8, wherein the first computer-generated score and the second computer-generated score are generated based on at least one of known properties of characters used on license plates in a determined jurisdiction, previously determined properties of previously processed license plates from the same location, or an expected number of characters on the license plate.

17. The method of claim 1, wherein the second threshold score is entered by a user prior to receiving the image of the license plate.

18. The system of claim 8, wherein the second threshold score is entered by a user prior to receiving the image of the license plate.

* * * * *